Figure 1:
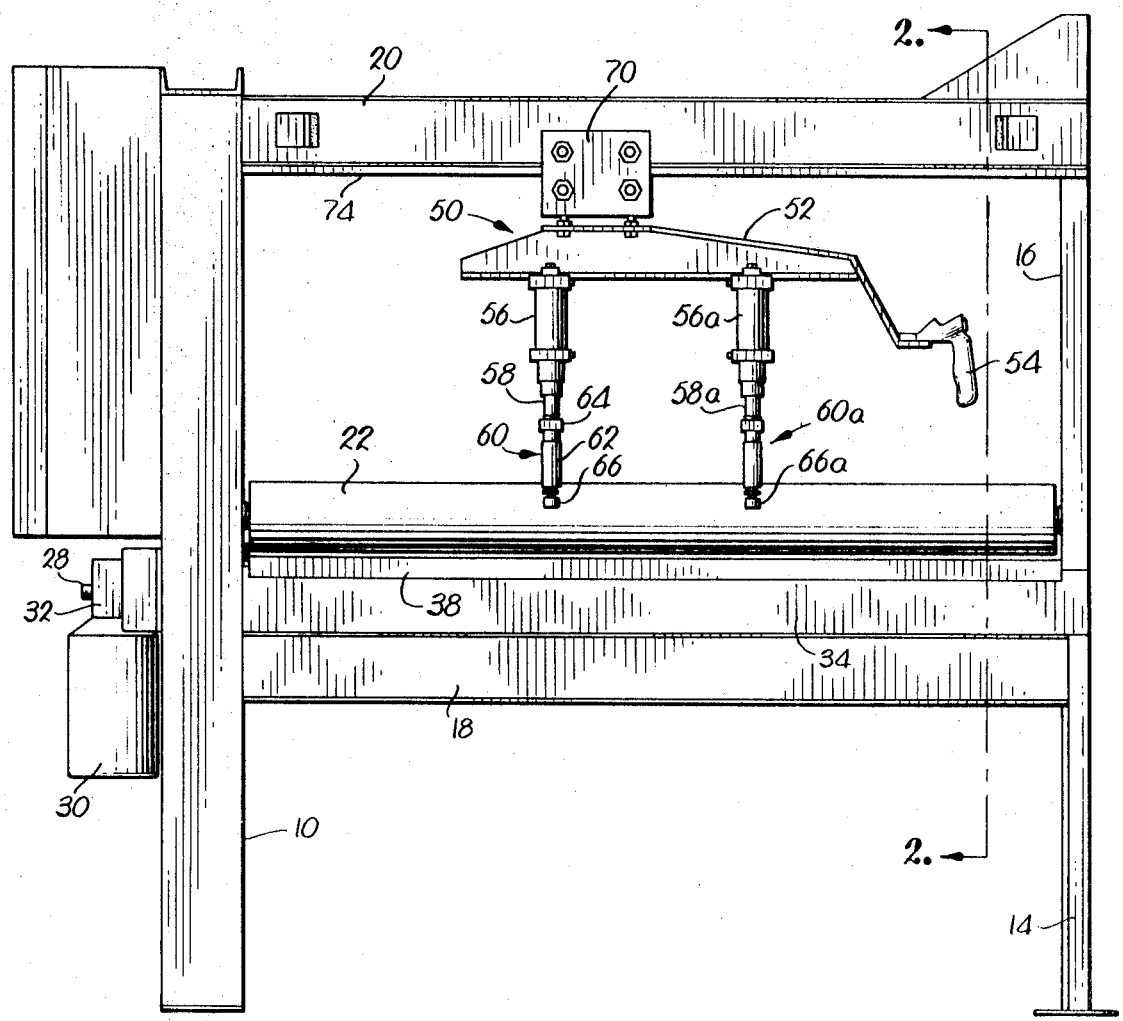

United States Patent

[11] 3,587,162

[72] Inventors Donald H. Dowdall
Kansas City, Kans.;
James W. Friley, Grandview; Daniel A. Sophy, Kansas City, Mo.
[21] Appl. No. 801,528
[22] Filed Feb. 24, 1969
[45] Patented June 28, 1971
[73] Assignee Schevenk, Incorporated,
Kansas City, Mo.

[54] DUCT LINER FASTENING APPARATUS
10 Claims, 7 Drawing Figs.
[52] U.S. Cl..................................................... 29/208,
122/408, 219/136
[51] Int. Cl......................................................... B23p 19/04
[50] Field of Search............................................29/208 (D),
200 (B), 211 (D), 202.5, 33, 33.52, 203; 122/408,
409; 219/136, 137

[56] References Cited
UNITED STATES PATENTS
| | | | |
|---|---|---|---|
| 3,372,456 | 3/1968 | Harper......................... | 29/208 |
| 3,444,027 | 5/1969 | Smith........................... | 29/211 |

*Primary Examiner*—John F. Campbell
*Assistant Examiner*—Donald P. Rooney
*Attorney*—Schmidt, Johnson, Hovey, Williams

ABSTRACT: Apparatus for use in the manufacture of duct panels to complete the fabrication of each panel after initial assembly of the metal sheet and accompanying liner, the latter being applied to a surface of the sheet that has been coated with an adhesive. The liner is subjected to a pressure roll which uniformly embeds the liner in the adhesive and feeds the sheet and liner to spot welding heads where fasteners are welded to the surface covered by the liner. The feed is controlled to effect incremental advancement of the sheet and liner to successive welding positions, the heads being operated to install the fasteners during each pause in the feed.

PATENTED JUN 28 1971

3,587,162

SHEET 1 OF 2

INVENTORS.
Donald H. Dowdall
James W. Friley
Daniel A. Sophy

BY Schmidt, Johnson, Hovey,
Williams & Chase.
ATTORNEYS.

INVENTORS.
Donald H. Dowdall
James W. Friley
Daniel A. Sophy

BY Schmidt, Johnson, Hovey,
Williams & Chase.
ATTORNEYS.

3,587,162

DUCT LINER FASTENING APPARATUS

Ducts for forced air heating and air-conditioning and other applications normally have a liner for absorbing noise, minimizing undesired sound transfer, and providing a degree of insulation. The ducts are formed from specially fabricated panels, each comprising a metal sheet to which the liner material has been attached. In order to prevent the liner from separating from the sheet, an adhesive is utilized at the liner-sheet interface in conjunction with suitable fasteners inserted through the liner and held in place by spot welding.

Hand methods are commonly employed to emplace the liner on the metal sheet after the latter is coated with the adhesive. If extreme care is not taken, a substantial portion of the liner material may not become sufficiently embedded in the adhesive coating to assure complete adhesion. Not infrequently, less than 50 percent of the adhesive coated contact area actually forms a solid bond between the sheet metal and the liner material. This, of course, ultimately produces a duct of inferior quality which is more subject to failure due to interference with airflow caused by separation of the liner from the internal surface of the metal duct.

Although the use of fasteners as mentioned above does serve to augment the holding ability of the adhesive, the fasteners primarily serve a safety function by preventing the liner material from parting under forces exerted thereon by the airstream within the duct. The liner material in widespread use at the present time comprises a glass fiber mat which is inherently subject to parting by the airstream since the adhesive is only capable of securing one face of the mat to the internal surface of the sheet metal duct structure. It might be expected that the problem of uniform adhesion could thus be alleviated by increasing the number of fasteners utilized to hold a given liner surface area; however, increasing the number of fasteners of itself creates a second difficulty in that the cost of the duct is thereby increased, together with the time required for fabrication of the duct panels.

It is, therefore, the primary object of the present invention to provide apparatus for completing the fabrication of duct panels after the adhesive is applied to the sheet and the liner is placed thereon, wherein completion of fabrication is effected rapidly and yet with assurance that the liner is uniformly bonded to the surface of the sheet.

In particular, it is an important object of this invention to provide apparatus as aforesaid for embedding the liner in the adhesive throughout the contact area of the liner and adhesive, thereby assuring that the holding capability of the adhesive is utilized to the maximum extent.

Furthermore, it is an important object of the invention to provide apparatus as aforesaid having improved spot-welding means for attaching the fasteners to the metal sheet with greater speed and efficiency.

Still another important aim of the invention is to provide apparatus having spot-welding means as aforesaid, wherein embedding of the liner in the adhesive is effected as the sheet and liner are incrementally advanced to successive welding positions.

Figure 3:
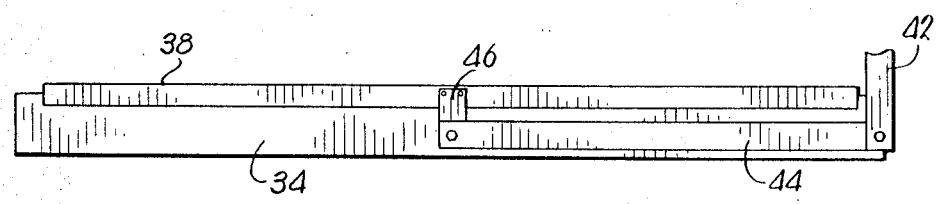
Figure 2:
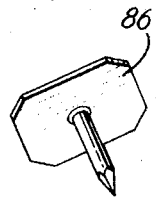
Figure 6:
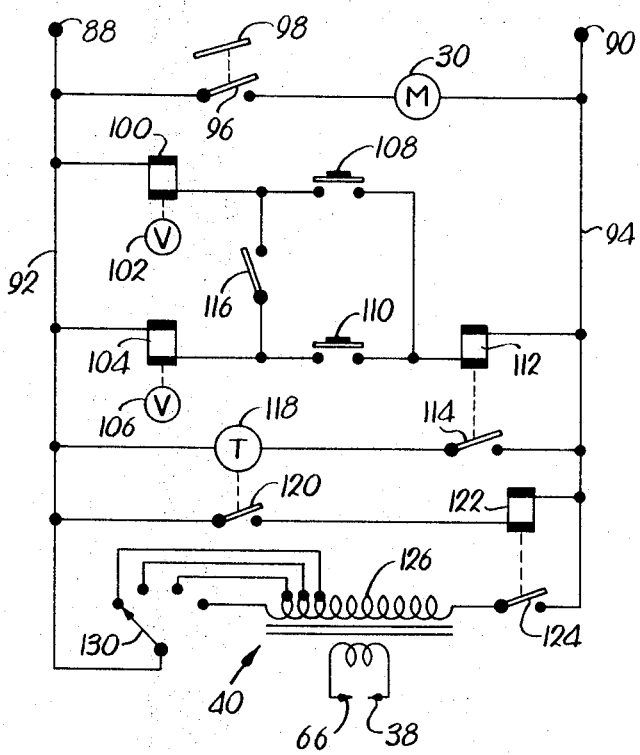
Figure 5:
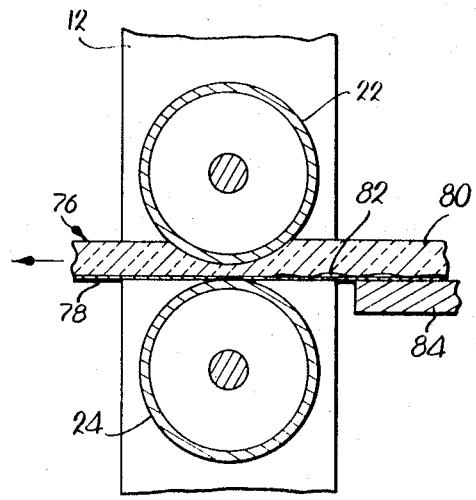
Figure 2:
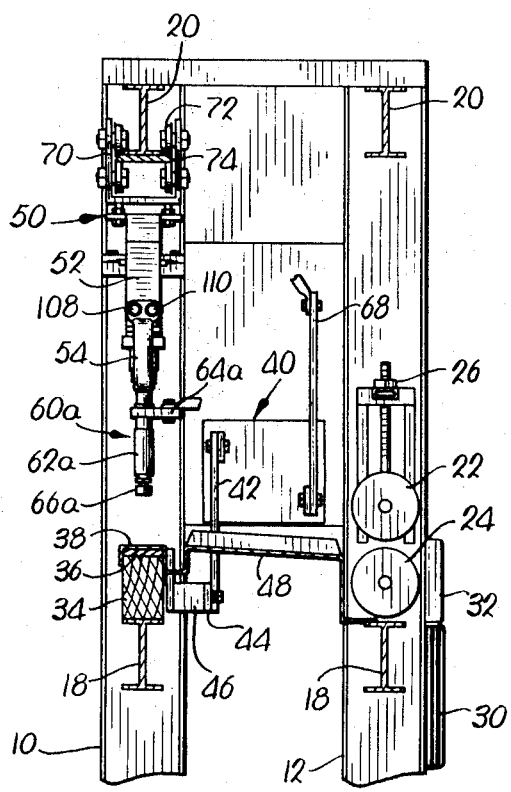
Figure 4:
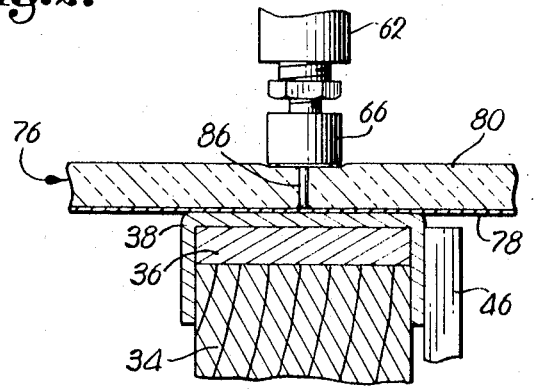

In the drawings:

FIG. 1 is a front elevational view of the apparatus;
FIG. 2 is a vertical sectional view taken along line 2—2 of FIG. 1;
FIG. 3 is a rear detail view of the conductive member forming one of the welding electrodes;
FIG. 4 is an enlarged, fragmentary, cross-sectional view of the conductive member illustrating the welding of a fastener to a duct panel;
FIG. 5 is an enlarged, cross-sectional, fragmentary, diagrammatic illustration of the feed and pressure rolls showing a duct panel received therebetween;
FIG. 6 is an electrical schematic diagram of a simplified control circuit for the apparatus; and
FIG. 7 is an enlarged, perspective view of a suitable fastener.

Referring to FIGS. 1—5, the frame of the apparatus is formed by a pair of spaced standards 10 and 12 at one side thereof and a pair of spaced standards 14 and 16 at the opposite side of the apparatus. A pair of horizontal, lower I-beams 18 span the standards 10, 14 and 12, 16. A pair of upper I-beams 20 are spaced above the I-beams 18 and are supported by the standards 10, 12 and 16, the standard 14 terminating at the top of the lower I-beam 18 supported thereby in order to define an opening in the right side of the frame (as viewed in FIG. 1) for operator access, as will be appreciated hereinafter.

A pair of cylindrical, horizontal, upper and lower feed rolls 22 and 24 respectively are supported by the standards 12 and 16 above the corresponding lower beam 18. Adjustment means 26 (FIG. 2) for the upper roll 22 is provided so that the vertical position of the roll 22 may be selectively varied to set the spacing between the two rolls 22 and 24 as desired. The lower roll 24 is driven, the axle 28 thereof being coupled to a drive motor 30 through a speed reduction transmission 32 (FIG. 1). The upper roll 22 is freely rotatable and also serves an important pressure application function to be discussed hereinafter.

A wooden insulator block 34 overlies the lower I-beam 18 spanning standards 10 and 14 and is coextensive therewith. A flat copper bar 36, in turn, overlies the insulator block 34. A welding electrode in the form of an elongated, transversely U-shaped copper member 38 rests upon the bar 36 and is inverted to receive the latter and embrace both the bar 36 and a portion of the insulator block 34, as is clear in FIGS. 3 and 4. The housing of a multitap welding transformer 40 is visible in FIG. 2 between the standards 10 and 12, an electrical connection to the electrode member 38 being effected by series connected bar conductors 42 and 44 which extend vertically and horizontally respectively from the appropriate transformer terminal to an L-shaped connector 46 attached to member 38 and bar 36 by suitable means, such as machine screws or the like which permit the connector 46 to be readily detached. It should be noted that the connector 46 is attached to the member 38 at the center thereof to equalize the length of the current path from connector 46 to the ends of the member 38. A flat, slightly inclined bed 48 (FIG. 2) is supported by the insulator block 34 and the lower beam 18 beneath roll 24, the forward edge of the bed 48 being closely spaced from the top of the member 38 and horizontally aligned therewith.

The lower flange of the upper beam 20 supported by standards 10 and 16 presents a horizontal rail upon which a carriage 50 is mounted. The carriage 50 includes a horizontal carrier bar 52 provided with a handle 54 extending from the end thereof adjacent standard 16. A pair of horizontally spaced, double acting, pneumatic piston and cylinder assemblies 56 and 56a are vertically oriented and have their upper ends fixed to the carrier bar 52. The piston rods 58 and 58a of assemblies 56 and 56a extend vertically downwardly therefrom and support a pair of resistance welding heads 60 and 60a respectively. The head 60 comprises a cylindrical electrode holder 62 attached at its upper end to the piston rod 58, an electrical connection thereto from the welding transformer 40 being effected by a terminal clamp 64. The electrode holder 62 may be provided with water connections for cooling purposes, such connections not being shown herein in the interest of clarity. The lower end of the holder 62 is threaded to receive a welding tip 66 comprising the electrode. The welding head 60a is of identical construction, the parts thereof being identified by the same reference characters with the addition of the a notation. Suitable electrical leads (broken away in FIG. 2) extend from a bar conductor 68 to the terminal clamps 64 and 64a, the conductor 68 being connected to the appropriate terminal of the welding transformer 40.

The carrier bar 52 of carriage 50 is secured to the bottom of a U-shaped plate 70, the latter having four pairs of vertically opposed rollers 72 rotatably mounted therein, two pairs of the rollers 72 being disposed on each side of the rail-forming beam 20. A track for the rollers 72 is provided by a metal strip 74 secured to the bottom flange of the beam 20 and having a width somewhat greater than the width of such flange, as is clear in FIG. 2.

A duct panel 76 under fabrication is illustrated in FIGS. 4 and 5. The panel 76 comprises a metal sheet 78 upon which a liner 80 is disposed in overlying relationship to one surface of the sheet 78, such surface having been previously coated with a suitable adhesive. This may be accomplished in a hand operation by spraying the adhesive onto the surface of the sheet and then emplacing the liner 80, commonly a glass fiber mat as discussed previously. In FIG. 5 the adhesive on the surface of the sheet 78 is illustrated at 82, the panel 76 being shown as it is fed by the rolls 22 and 24 and advanced to the left, thereby removing the panel 76 from a table or conveyor 84 which, although not shown in the other FIGS. would be disposed adjacent the feed end of the apparatus at a level to direct the panel 76 under fabrication into the rolls 22 and 24. In FIG. 4 the panel 76 is illustrated at the time of welding a fastener 86 to the surface of the sheet 78 covered by the liner 80, the fastener 86 comprising a pin with a sharpened point (prior to welding) at one end and an enlarged retaining head at the opposite end, as may be clearly seen in FIG. 7.

A simplified, exemplary control circuit for the apparatus is illustrated in FIG. 6. Terminals 88 and 90 are connected to a suitable electrical power source, leads 92 and 94 extending from terminals 88 and 90 respectively. A normally open switch 96 is operated by a foot pedal 98 and is connected in series with the motor 30 across leads 92 and 94. A solenoid 100 operates a four-way air valve 102 which controls the operation of pneumatic piston and cylinder assembly 56. Similarly, a solenoid 104 controls a four-way valve 106 which operates the piston and cylinder assembly 56a. The two solenoids 100 and 104 are energized by actuating pushbutton switches 108 and 110 respectively, the energizing circuits for the solenoids 100 and 104 being in parallel and connected in series with a relay coil 112 which operates a relay switch 114. As is clear in FIG. 2, the switches 108 and 110 are mounted in the handle 54, the pushbuttons thereof being disposed for selective manual actuation by the operator. A single pole selector switch 116, upon closure thereof, connects the solenoids 100 and 104 directly in parallel so that operation of either pushbutton switch 108 or 110 effects energization of both solenoids simultaneously.

The relay switch 114 connects a suitable timer 118 across leads 92 and 94, the timer 118 having a normally open switch 120 which closes after a delay and then reopens after a predetermined time period. The switch 120 connects the coil 122 of a transformer relay across the leads 92 and 94, the coil 122 operating a relay switch 124 which is in series with the primary winding 126 of the welding transformer 40. A low voltage, high current secondary winding 128 delivers welding current to the electrodes 38 and 66 which are schematically illustrated. The transformer 40 is of the multiple-tap type, a four position rotary switch 130 being connected in series with the primary winding 126 to control the magnitude of the welding current and hence the heat produced during the welding operation.

OPERATION

As discussed hereinabove, the first stage of fabrication of the duct panels may be accomplished by hand. The liner 80 is placed on the upper surface of the metal sheet 78 after such surface is coated with a suitable adhesive 82 (FIG. 5). Before the adhesive 82 dries or sets, the leading edge of the partially formed panel 76 is inserted by hand or otherwise into the rolls 22 and 24. For a glass fiber liner material having a thickness of one-half to 1 inch, the spacing between the rolls 22 and 24 may be set at approximately three-eights inch. This provides sufficient friction for positive feed of one-half inch material and also accomplishes the requisite embedding of the liner 80 into the adhesive 82 to be subsequently discussed, yet the roll spacing will accommodate the 1 inch material due to its inherent resilience. The lower roll 24 would normally be wrapped with a suitable nonmetallic material to avoid metal-to-metal contact between the roll 24 and the undersurface of the sheet 78 and increase the friction therebetween.

To advance the semifinished panel 76 into the throat of the apparatus to a desired position beneath the welding heads 60 and 60a, the operator depresses the foot pedal 98 to energize motor 30 and thereby drive the lower roll 24. The operator would normally stand at the right side of the apparatus as viewed in FIG. 1 with one hand on the handle 54. As the panel 76 advances, the liner 80 is compressed by the pressure roll 22 bearing thereagainst, as depicted in FIG. 5. This application of uniform pressure across the entire width of the liner 80 positively embeds the lower face of the liner mat into the adhesive 82. Therefore, when the adhesive 82 ultimately dries or sets, it is assured that uniform bonding of the liner 80 to the sheet 78 is effected throughout the contact area.

The operator releases the foot pedal 98 when the panel 76 reaches the desired position beneath the welding heads 60 and 60a. An automatic brake (not shown) may be utilized in conjunction with the motor 30 to avoid overshoot and effect substantially instantaneous termination of the feed when the switch 96 is opened. The fasteners 86 are then installed at the desired points of attachment, utilizing one or both of the welding heads 60 and 60a. The welding tips 66 and 66a may be provided with internal magnets (not shown) to hold the fasteners 86 thereon prior to actual accomplishment of the weld. Thus, the operator places the heads of the fasteners 86 flush against the bottoms of the welding tips 66 and 66a and then actuates the pushbuttons 108 and 110, or only one of the pushbuttons if the selector switch 116 is closed to cause simultaneous energization of the solenoids 100 and 104 that operate the air valves 102 and 106.

Assuming with reference to FIGS. 4 and 6 that the operator actuates pushbutton switch 108 to operate the welding head 60, closure of switch 108 causes the piston rod 58 to extend and thereby shifts the loaded welding tip 66 downwardly. The pin of the fastener 86 penetrates the liner 80 and ultimately contacts the upper surface of the metal sheet 78. At the time the switch 108 was initially closed, relay coil 112 was energized to close switch 114 and actuate the timer 118, the latter being set to close timer switch 120 after a predetermined delay or squeeze time that allows the piston rod 58 to extend sufficiently to fully insert the fastener 86. At the termination of the squeeze time, the switch 120 closes to energize relay coil 122 and close switch 124, thereby energizing the welding transformer 40. This makes welding current available to the two electrodes formed by the welding tip 66 and the copper member 38, the latter being disposed directly beneath the fastener 86 in contact with the undersurface of the sheet 78 as is clear in FIG. 4. The timer switch 120 reopens to terminate the delivery of welding current after an appropriate time interval which would be selected to assure proper formation of the weld at the tip of the fastener pin. The operator may now release the pushbutton 108 to open the associated switch and raise the welding head 60 to its normal position. Manifestly, the operation is the same for the welding head 60a and for both heads simultaneously upon closure of the selector switch 116. The rotary switch 130 is set in accordance with the heat range needed to produce an effective weld in a given application.

From the foregoing, it may be readily appreciated that as many fasteners 86 as desired may be rapidly installed at predetermined points of attachment across the sheet 78. Additional welding heads and associated piston and cylinder assemblies may be mounted on the carrier bar 52 if desired in order to simultaneously weld an entire row of fasteners to the sheet 78 in a single operation. The location of the connector 46 at the center of the electrode member 38 enables the throat of the apparatus defined by the opposed standards 12 and 16 to be of a greater width than if the connection were made to one of the ends of the member 38, since the maximum length of the current path from the connector 46 to either end of the member 38 is limited to one-half the length thereof. An additional feature is the fact that the member 38 may be readily replaced after the upper surface thereof has undergone excessive underlying but the underlying copper support bar 36 is at all times protected and may remain permanently secured to the underlying insulator block 34.

After the row of fasteners 86 is welded to the sheet 78, the operator again depresses foot pedal 98 to advance the panel 76 to the next welding position where the operation is repeated to install another row of fasteners. It may be appreciated, therefore, that the feed is intermittent in order to incrementally advance the panel 76 to successive welding positions beneath the welding heads 60 and 60a. This is rapidly accomplished while additional panels are in the first stage of fabrication and being readied for introduction into the feed rolls 22 and 24. Thus, the fabrication of the panel 76 may be accomplished on a rapid, production line basis utilizing the exemplary semiautomatic control circuit illustrated herein. Alternatively, it is evident that the apparatus of the instant invention lends itself to fully automatic control of the feeding and welding functions. Having thus described the invention, what is claimed as new and desired to be secured by Letters Patent is:

We claim:

1. In the manufacture of duct panels where one surface of a metallic sheet is coated with an adhesive and a liner is placed on said surface in overlying relationship thereto, apparatus for completing the fabrication of the panel comprising:

feed means for receiving said sheet with the liner thereon and pressing the liner against said surface to cause the liner to uniformly adhere thereto, and for advancing the sheet and liner along a predetermined path of travel;

an electrically conductive member in said path disposed to establish electrical contact with the opposite surface of said sheet as the latter is advanced along said path;

a resistance welding head reciprocable toward and away from said member and adapted to insert a fastener into said liner into contact with said one surface as the head is shifted toward said member;

electrical power supply means coupled with said member and said head for supplying welding current thereto; and control means coupled with said feed means for operating the latter to effect said pressing of the liner against said one surface and advancement of the sheet and liner along said path, and coupled with said supply means for operating the latter to effect delivery of said welding current when said head is shifted toward said member to insert said fastener and bring the latter into contact with said one surface.

2. The apparatus as claimed in claim 1, said control means being operable to effect incremental advancement of the sheet and liner along said path to place the sheet in successive welding positions on said member.

3. The apparatus as claimed in claim 1, and drive means coupled with said head for reciprocating the latter; and said control means being operable to effect incremental advancement of the sheet and liner along said path to place the sheet in successive welding positions on said member, and being coupled with said drive means for operating the latter at each of said welding positions to effect insertion of the fasteners and contact thereof with said one surface.

4. The apparatus as claimed in claim 1, said feed means including a pressure roll engageable with said liner as the latter and the sheet are received by the feed means; and the axis of said roll being substantially orthogonal to said path.

5. The apparatus as claimed in claim 1, said feed means further including a second roll in substantial parallelism with said pressure roll, and a prime mover coupled with one of said rolls for rotating the latter;

said rolls receiving the sheet and liner therebetween; and said control means being operable to effect intermittent operation of said prime mover to incrementally advance the sheet and liner along said path and place the sheet in successive welding positions on said member.

6. The apparatus as claimed in claim 1, said member being elongated and transversely U-shaped in configuration;

an elongated support bar extending substantially orthogonally of said path therebeneath; and said member being disposed in an inverted disposition overlying said bar and embracing the latter for support thereby, whereby the member protects the bar from wear and yet may be readily removed for replacement as required.

7. The apparatus as claimed in claim 1, there being a plurality of said heads spaced transversely of said path; and structure mounting said heads for movement transversely of said path and laterally with respect to the sheet and liner, whereby to permit selective positioning of the heads across the sheet and liner at predetermined points of attachment of the fasteners.

8. The apparatus as claimed in claim 7, said structure including a plurality of fluid-operated piston and cylinder assemblies operably coupled with corresponding heads for reciprocating the latter toward and away from said member; and said control means being coupled with said assemblies for operating the latter to effect shifting of the heads toward said member for insertion of the fasteners at said points of attachment.

9. The apparatus as claimed in claim 7, said structure including a plurality of fluid-operated piston and cylinder assemblies operably coupled with corresponding heads for reciprocating the latter toward and away from said member; and said control means being operable to effect incremental advancement of the sheet and liner along said path to place the sheet in successive welding positions on said member, and being coupled with said assemblies for operating the latter at each of said welding positions to effect insertion of said fasteners and contact thereof with said one surface at said points of attachment.

10. The apparatus as claimed in claim 7, and means supporting said structure and said member and defining a throat transversely of said path for receiving the sheet and liner as the same are advanced therealong;

said member being elongated and extending completely across said throat; and said supply means being connected to said member intermediate its ends and centrally of said throat, whereby to provide a low resistance path for flow of said welding current to either end of said member.

UNITED STATES PATENT OFFICE
CERTIFICATE OF CORRECTION

Patent No. 3,587,162　　　　　　　　　　Dated　　June 28, 1971

Inventor(s)　　Donald H. Dowdall et al.

It is certified that error appears in the above-identified patent and that said Letters Patent are hereby corrected as shown below:

On the cover sheet [73] "Schevenk, Incorporated" should read -- Schwenk, Incorporated --.

Signed and sealed this 7th day of March 1972.

(SEAL)
Attest:

EDWARD M. FLETCHER, JR.　　　　　　　　ROBERT GOTTSCHALK
Attesting Officer　　　　　　　　　　　Commissioner of Patents